(12) United States Patent
McEachern

(10) Patent No.: US 11,397,869 B2
(45) Date of Patent: Jul. 26, 2022

(54) METHODS AND SYSTEMS FOR DETECTING IMPERSONATING SOCIAL MEDIA PROFILES

(71) Applicant: ZeroFOX, Inc., Baltimore, MD (US)

(72) Inventor: Kavan B. McEachern, Baltimore, MD (US)

(73) Assignee: ZeroFOX, Inc., Baltimore, MD (US)

( * ) Notice: Subject to any disclaimer, the term of this patent is extended or adjusted under 35 U.S.C. 154(b) by 0 days.

(21) Appl. No.: 17/249,425

(22) Filed: Mar. 2, 2021

(65) Prior Publication Data
US 2021/0279502 A1 Sep. 9, 2021

Related U.S. Application Data

(60) Provisional application No. 62/984,952, filed on Mar. 4, 2020.

(51) Int. Cl.
*G06K 9/62* (2022.01)
*G06V 10/46* (2022.01)

(52) U.S. Cl.
CPC ......... *G06K 9/6201* (2013.01); *G06V 10/462* (2022.01)

(58) Field of Classification Search
CPC .. G06K 9/6201; G06V 10/462; G06V 10/751; G06V 40/172
See application file for complete search history.

(56) References Cited

U.S. PATENT DOCUMENTS

| 2005/0238198 | A1* | 10/2005 | Brown | G06V 10/443 |
| | | | | 382/103 |
| 2007/0217676 | A1* | 9/2007 | Grauman | G06V 10/462 |
| | | | | 382/190 |
| 2009/0238460 | A1* | 9/2009 | Funayama | G06V 10/462 |
| | | | | 382/181 |
| 2011/0299770 | A1* | 12/2011 | Vaddadi | G06V 10/757 |
| | | | | 382/165 |
| 2014/0064626 | A1* | 3/2014 | Chon | G06T 5/00 |
| | | | | 382/209 |

(Continued)

OTHER PUBLICATIONS

Tyagi, Introduction to ORB (Oriented FAST and Rotated BRIEF), https://medium.com, Jan. 1, 2019, 8 pages.

(Continued)

*Primary Examiner* — Aaron W Carter
(74) *Attorney, Agent, or Firm* — DLA Piper LLP (US)

(57) ABSTRACT

A method may include generating a first scaled variant pyramid associated with a first image and a second scaled variant pyramid associated with a second image; determining a pair of best-matching variants; detecting a first plurality of keypoints in the first variant and a second plurality of keypoints in the second variant; generating a descriptor for each keypoint of the first plurality of keypoints to create a first plurality of keypoint descriptors; generating a descriptor for each keypoint of the second plurality of keypoints to create a second plurality of keypoint descriptors; for each keypoint of the first plurality of keypoints, identifying a keypoint match from the second plurality of keypoints; determining that a number of keypoint matches is above a threshold number; and in response to determining that the number of keypoint matches is above the threshold number, determining that the first image matches the second image.

20 Claims, 8 Drawing Sheets

(56) References Cited

U.S. PATENT DOCUMENTS

| | | | | |
|---|---|---|---|---|
| 2014/0226906 A1* | 8/2014 | Kang | ............... | G06V 10/462 |
| | | | | 382/197 |
| 2016/0335519 A1* | 11/2016 | Wagner | ............... | G06V 10/42 |
| 2017/0154244 A1* | 6/2017 | Brendel | ............... | G06T 7/90 |
| 2019/0005658 A1* | 1/2019 | Zamalloa | ............... | G06T 17/05 |
| 2019/0068632 A1* | 2/2019 | Foster | ............... | H04L 63/1425 |
| 2020/0013184 A1* | 1/2020 | Linde | ............... | G06T 7/246 |
| 2020/0050880 A1* | 2/2020 | Pope | ............... | H04N 5/23267 |
| 2020/0167953 A1* | 5/2020 | Liu | ............... | G05D 1/0094 |
| 2020/0226781 A1* | 7/2020 | Ma | ............... | G06T 7/277 |
| 2020/0327694 A1* | 10/2020 | Lin | ............... | G06F 17/16 |
| 2020/0327695 A1* | 10/2020 | Lin | ............... | G06V 20/20 |
| 2021/0279502 A1* | 9/2021 | McEachern | ............... | G06V 10/462 |
| 2021/0357498 A1* | 11/2021 | McEachern | ............... | G06F 21/552 |

OTHER PUBLICATIONS

Lowe, "Distinctive Image Features from Scale-Invariant Keypoints", International Journal of Computer Vision, Jan. 5, 2004, 28 pages.

Sovann, "Label Recognition with ORB", https://medium.com, Sep. 6, 2019, 9 pages.

Kaehler, et al., "Learning OpenCV 3: Computer Vision in C++ with the OpenCV Library", O'Reilly Media, Inc., 2017, 1018 pages.

Rublee, et al., "ORB: An efficient alternative to SIFT or SURF", 2011 International conference on computer vision, 2011, 8 pages.

Goga, "Matching User Accounts Across Online Social Networks: Methods and Applications", Computer Science, LIP6-Laboratoire d'Informatique de Paris 6, 2014, English, 151 pages.

* cited by examiner

METHODS AND SYSTEMS FOR DETECTING IMPERSONATING SOCIAL MEDIA PROFILES

CROSS-REFERENCE TO RELATED APPLICATION

This application claims priority to U.S. Provisional Application No. 62/984,952, filed Mar. 4, 2020, which is hereby incorporated by reference in its entirety.

BACKGROUND

Fake accounts on social media often serve as the foundation for broader digital attacks. Bad actors use fraudulent accounts to target your legitimate followers, employees and customers. Risks associated with impersonating accounts can include phishing and malware distribution, malicious and offensive content sharing, scams and fake coupon sharing, brand and executive reputation damage, and sensitive information leakage through social engineering attacks.

With social media and digital engagement on the rise, marketing teams are investing heavily in growing their digital footprint as a way to drive brand awareness and generate revenue. Impersonating accounts pretending to be associated with a brand can steal hard-earned followers and traffic while retracting customer loyalty and creating distrust. In many cases, marketing teams need to take stock of owned accounts and monitor for fraudulent accounts in an effort to grow business and raise awareness securely. From high-profile executives to small business CEOs, impersonations on social media can negatively affect reputation, brand loyalty and customer and employee trust. Bad actors pretending to be executives often target employees with spear phishing attempts and spread slanderous messages and offensive content. Many organizations need to make a conscious effort to protect executives from fraudulent profiles in order to protect not only the executive, but the entire business.

SUMMARY OF THE INVENTION

Embodiments of the present disclosure relate to systems and methods for detecting impersonating social profiles and detecting matching images. According to one aspect of the present disclosure, the method may include generating a first scaled variant pyramid associated with a first image and a second scaled variant pyramid associated with a second image, wherein each scaled variant pyramid may include a plurality of scaled variants of the associated image; determining a pair of best-matching variants, wherein the pair of best-matching variants may include a first variant from the first scaled variant pyramid and a second variant from the second scaled variant pyramid that best-matches the first variant; detecting a first plurality of keypoints in the first variant and a second plurality of keypoints in the second variant; generating a descriptor for each keypoint of the first plurality of keypoints to create a first plurality of keypoint descriptors, each descriptor of the first plurality of keypoint descriptors being associated with a keypoint of the first plurality of keypoints; generating a descriptor for each keypoint of the second plurality of keypoints to create a second plurality of keypoint descriptors, each descriptor of the second plurality of keypoint descriptors being associated with a keypoint of the second plurality of keypoints; for each keypoint of the first plurality of keypoints, identifying a keypoint match from the second plurality of keypoints; determining that a number of keypoint matches is above a threshold number; and in response to determining that the number of keypoint matches is above the threshold number, determining that the first image matches the second image.

In some embodiments, identifying the keypoint match may include determining, via a locality-sensitivity hash (LSH) algorithm and based on the first and second pluralities of keypoint descriptors, a first and second degree nearest neighbor, wherein each nearest neighbor may include a keypoint of the second plurality of keypoints; performing a ratio test on the first and second degree nearest neighbors to calculate a ratio; determining that the ratio is above a threshold value; and in response to determining that the ratio is above the threshold value, determining that the keypoint of the first plurality of keypoints and the keypoint of the first degree nearest neighbor constitute the keypoint match. In some embodiments, the threshold ratio may be between 0.55 and 0.6.

In some embodiments, determining the pair of best-matching variants may include, for each scaled variant of the first scaled variant pyramid, calculating an absolute value of a difference of squares between the scaled variant of the first scaled variant pyramid and each scaled variant of the second scaled variant pyramid; and identifying the scaled variant of the first scale variant pyramid and the scaled variant of the second scale variant pyramid with a lowest absolute value as the pair of best-matching variants.

In some embodiments, detecting the first and second pluralities of keypoints may include, for each pixel in the first and second variant, assigning an intensity value to the pixel and a plurality of surrounding pixels; determining whether the intensity value of each pixel of the plurality of surrounding pixels is greater than, less than, or the same as the intensity of the pixel; and in response to determining that a pre-defined threshold number of pixels of the plurality of surrounding pixels have intensities one of greater than or less than the intensity value of the pixel, determining that the pixel is a keypoint. In some embodiments, detecting the first and second pluralities of keypoints and generating a descriptor may include using an oriented features from accelerated segment test and rotated binary robust independent elementary features (ORB) algorithm. In some embodiments, the threshold number of matching keypoints may be four, five, or six.

In some embodiments, generating the descriptor for each keypoint of the first plurality of keypoints and generating the descriptor for each keypoint of the second plurality of keypoints may include assigning a bit value of 1 to a plurality of pixels surrounding the keypoint with an intensity greater than the keypoint; assigning a bit value of 0 to a plurality of pixels surrounding the keypoint with an intensity less than or equal to the keypoint; creating an intensity centroid for the plurality of pixels; detecting a corner based on the intensity of each of the plurality of pixels; and generating a vector based on the intensity centroid and the corner, the vector being the descriptor. In some embodiments, the descriptor may be a vector with a length of two hundred and fifty six. In some embodiments, determining a nearest neighbor may include calculating a Euclidean distance between a descriptor of the first plurality of keypoint descriptors and at least one descriptor of the second plurality of descriptors.

According to another aspect of the present disclosure, a method for determining whether a first image matches a second image may include generating a scaled variant pyramid for each of the first image and the second image to obtain a first scaled variant pyramid associated with the first image and a second scaled variant pyramid associated with the second image, wherein each scaled variant pyramid may include a plurality of scaled variants of an associated image; determining a pair of best-matching variants, wherein the pair of best-matching variants may include a first variant from the first scaled variant pyramid and a second variant from the second scaled variant pyramid that best-matches the first variant; detecting a first plurality of keypoints in the first variant and a second plurality of keypoints in the second variant; generating a descriptor for each keypoint of the first plurality of keypoints to create a first plurality of keypoint descriptors, each descriptor of the first plurality of keypoint descriptors being associated with a keypoint of the first plurality of keypoints; generating a descriptor for each keypoint of the second plurality of keypoints to create a second plurality of keypoint descriptors, each descriptor of the second plurality of keypoint descriptors being associated with a keypoint of the second plurality of keypoints; for each keypoint of the first plurality of keypoints, identifying a keypoint match from the second plurality of keypoints; determining that a number of keypoint matches is above a threshold number; analyzing the first and second image to generate a match prediction via a difference hash (dHash) algorithm; and in response to determining that the number of keypoint matches is above the threshold number and generating a match prediction that indicates a match, determining that the first image matches the second image.

In some embodiments, analyzing the first and second image to generate a match prediction via the dHash algorithm may include, for each of the first and second image, down-sampling the image to reduce a size of the image; reducing colors of the image to a grayscale color scheme; for each pixel, computing a difference in intensity between adjacent pixels; and assigning a bit value to each pixel based on the difference to create a difference hash. The method may also include comparing the difference hash of each image to generate a match prediction.

In some embodiments, identifying the keypoint match may include determining, via a locality-sensitivity hash (LSH) algorithm and based on the first and second pluralities of keypoint descriptors, a first and second degree nearest neighbor, each nearest neighbor comprising a keypoint of the second plurality of keypoints; performing a ratio test on the first and second degree nearest neighbors to calculate a ratio; determining that the ratio is above a threshold value; and in response to determining that the ratio is above the threshold value, determining that the keypoint of the first plurality of keypoints and the keypoint of the first degree nearest neighbor constitute the keypoint match. In some embodiments, the threshold ratio may be between 0.55 and 0.6.

In some embodiments, determining the pair of best-matching variants may include, for each scaled variant of the first scaled variant pyramid, calculating an absolute value of a difference of squares between the scaled variant of the first scaled variant pyramid and each scaled variant of the second scaled variant pyramid; and identifying the scaled variant of the first scale variant pyramid and the scaled variant of the second scale variant pyramid with a lowest absolute value as the pair of best-matching variants.

In some embodiments, generating the descriptor for each keypoint of the first plurality of keypoints and generating the descriptor for each keypoint of the second plurality of keypoints may include, for each keypoint, assigning a bit value of 1 to a plurality of pixels surrounding the keypoint with an intensity greater than the keypoint; assigning a bit value of 0 to a plurality of pixels surrounding the keypoint with an intensity less than or equal to the keypoint; creating an intensity centroid for the plurality of pixels; detecting a corner based on the intensity of each of the plurality of pixels; and generating a vector based on the intensity centroid and the corner, the vector being the descriptor. In some embodiments, detecting the first and second pluralities of keypoints and generating a descriptor may include using an oriented features from accelerated segment test and rotated binary robust independent elementary features (ORB) algorithm. In some embodiments, determining a nearest neighbor may include calculating a Euclidean distance between a descriptor of the first plurality of keypoint descriptors and at least one descriptor of the second plurality of descriptors.

According to another aspect of the present disclosure, a method for detecting impersonating social media profiles may include receiving a source image from a protected entity; detecting a candidate impersonating profile of the protected entity based on information other than image data; obtaining a comparison image from the candidate impersonating profile; generating a scaled variant pyramid for each of the comparison image and the source image to obtain a first scaled variant pyramid associated with the comparison image and a second scaled variant pyramid associated with the source image, wherein each scaled variant pyramid may include a plurality of scaled variants of an associated image; determining a pair of best-matching variants, wherein the pair of best-matching variants may include a first variant from the first scaled variant pyramid and a second variant from the second scaled variant pyramid that best-matches the first variant; detecting a first plurality of keypoints in the first variant and a second plurality of keypoints in the second variant; generating a descriptor for each keypoint of the first plurality of keypoints to create a first plurality of keypoint descriptors, each descriptor of the first plurality of keypoint descriptors being associated with a keypoint of the first plurality of keypoints; generating a descriptor for each keypoint of the second plurality of keypoints to create a second plurality of keypoint descriptors, each descriptor of the second plurality of keypoint descriptors being associated with a keypoint of the second plurality of keypoints; for each keypoint of the first plurality of keypoints, identifying a keypoint match; determining that a number of keypoint matches is above a threshold number; and in response to determining that the number of keypoint matches is above the threshold number, determining that the comparison image matches the source image. Identifying the keypoint match may include determining, via a locality-sensitivity hash (LSH) algorithm, at least one nearest neighbor, each nearest neighbor comprising a keypoint from the second plurality of keypoints; and analyzing the keypoint and the at least one nearest neighbor to identify the keypoint match.

BRIEF DESCRIPTION OF THE DRAWINGS

Various objectives, features, and advantages of the disclosed subject matter can be more fully appreciated with reference to the following detailed description of the disclosed subject matter when considered in connection with the following drawings, in which like reference numerals identify like elements.

The drawings are not necessarily to scale, or inclusive of all elements of a system, emphasis instead generally being placed upon illustrating the concepts, structures, and techniques sought to be protected herein.

DETAILED DESCRIPTION OF SEVERAL EMBODIMENTS

The following detailed description is merely exemplary in nature and is not intended to limit the invention or the applications of its use.

Embodiments of the present disclosure relate to an improved system and method for detecting impersonating social media profiles via image comparing and image matching. The methodology of the present disclosure may include a keypoint detection method for image comparisons, as well as combined technique using both a keypoint detection method and a dHash (difference hash) image matching algorithm. In some embodiments, a keypoint can be a group of pixels that form a corner-like image patch within an image. In some embodiments, a dHash algorithm can track gradients across pixels to detect similar images. Additional details of these methods are described in relation to FIGS. 1-6. The image matching techniques described herein may be used in accordance with other methods for detecting impersonating profiles, such as those described in U.S. application Ser. No. 15/998,930 ("Malicious Social Media Account Identification"), now U.S. Publication No. 2019/0068632, which is herein incorporated by reference. For example, if an entity wishes to detect impersonating profiles of their CEO in the wild (e.g. in the public social media sphere), techniques such as those described in "Malicious Social Media Account Identification" may be used to find candidates that may constitute impersonating profiles. These profiles may be detected based on matching information or data that is not imaged related, such as names and/or other information (e.g. date of birth, location, employment, etc.). Once a pool of candidates is found, the pictures associated with the candidate profiles may be compared, via the techniques described herein, with a source image. The source image may be a known picture of the CEO provided by the entity being protected. If a candidate profile's image is determined to match the source image, then that candidate profile may be classified as an impersonating profile.

The methods and systems described in the present disclosure offer an improved methodology for comparing images and detecting matching images and offer a higher degree of transformation-invariance, or resistance to transformations. A common image matching algorithm is pHash (perceptual hash). pHash works by creating a digital fingerprint that consists of low frequency brightness signals encoded in the image's pixel data, which is then used to match against novel images. However, this method has a small tolerance for transformations, which means that more significant image transformations (e.g. large crops, rotations, and other affine transformations) may foil the algorithm and negatively impact the accuracy of match detections.

Figure 1:
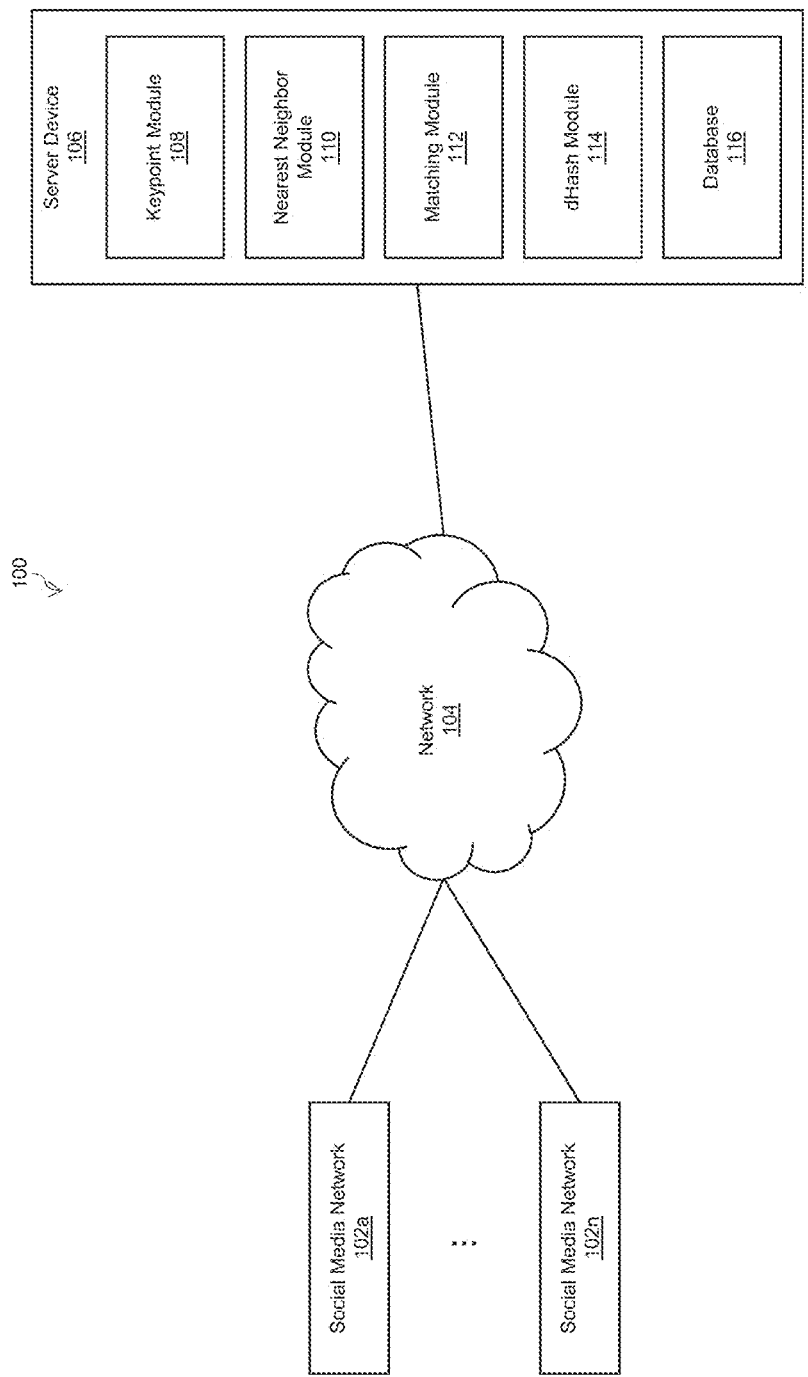
FIG. 1 is a system for detecting impersonating social media profiles, according to some embodiments of the present disclosure.

FIG. 1 is a system 100 for detecting impersonating social media profiles, according to some embodiments of the present disclosure. In some embodiments, system 100 may include a server device 106 communicably connected via network 104 to a plurality of social media networks 102a, . . . , 102n (102 generally). Social media networks 102 may include Facebook, Twitter, Instagram, LinkedIn, Google+, and the like.

Network 104 may include one or more wide areas networks (WANs), metropolitan area networks (MANs), local area networks (LANs), personal area networks (PANs), or any combination of these networks. Network 104 may include a combination of one or more types of networks, such as Internet, intranet, Ethernet, twisted-pair, coaxial cable, fiber optic, cellular, satellite, IEEE 801.11, terrestrial, and/or other types of wired or wireless networks. Network 104 can also use standard communication technologies and/or protocols.

In some embodiments, server device 106 may include a keypoint module 108, a nearest neighbor module 110, a matching module 112, a dHash module 114, and a database 116. Server device 106 may be configured to monitor social media networks 102 and obtain images from social media profiles. In some embodiments, the database 116 may be separate from server device 106. Keypoint module 108 may be configured to detect keypoints in an image and generate descriptors for the keypoints. Keypoint module 108 may be configured to process an image with an Oriented FAST (features from accelerated segment test) and Rotated BRIEF (binary robust independent elementary features) keypoint detection algorithm (ORB), similar to or the same as the ORB technique described in "Orb: An Efficient Alternative to SIFT or SURF," Ethan Rublee, 2011 International Conference on Computer Vision (2011), which is herein incorporated by reference. With respect to ORB, as mentioned above, a keypoint may be a group of pixels that form a corner-like patch within an image. Keypoint module 108 may also use an intensity centroid to measure the orientation of the keypoint. For each keypoint detected, keypoint module 108 may also be configured to generate an associated descriptor. A descriptor may be a set of one or more vectors that yield a degree of transformation-invariance.

In some embodiments, nearest neighbor module 110 may be configured to determine the nearest neighbors for each keypoint detected by keypoint module 108. In order to assess commonalities between two images, the keypoint descriptors for one image can be matched with those of a comparator image. Since a keypoint descriptor is a set of vectors, similarity between descriptors from different images may be defined by Euclidean distance. Nearest neighbor module 110 may be configured to calculate Euclidean distances between descriptors. Nearest neighbor module 110 may also be configured to process all calculated Euclidean distances (e.g. between each combination of descriptors across two separate sets of descriptors) with a nearest neighbor search methodology, such as Fast Library for Approximate Nearest Neighbor (FLANN). FLANN is a nearest neighbor search library that may determine which descriptor from a set of descriptors of one image is nearest to a descriptor of another image. Nearest neighbor module 110 may also rank each descriptor in the set of descriptors in order of the distance from the original descriptor. In some embodiments, specific search algorithms within FLANN may be used, according to one's preference. In some embodiments, a locality-sensitive hashing (LSH) algorithm may be used. An LSH algorithm is a hashing strategy that may preserve the relative distance between items during transformation. The algorithm may also seek hash collisions as a means of reducing the dimensionality of the input data (e.g. the set of keypoint descriptors to search through). An LSH algorithm may attempt to maximize hash collisions (a hash collision is when multiple pieces of data, e.g. pixels, have the same hash value). The algorithm may hash similar input items into "buckets" with high probability. This may significantly improve the time complexity of searching for matching descriptors while still yielding an approximately sorted list of nearest neighbors. Note, "nearest" may refer to the actual Euclidean distance between the vectors that make up a descriptor.

In some embodiments, matching module 112 may be configured to analyze the results of nearest neighbor module 110 to determine if two keypoints can be considered a match. Matching module 112 may be configured to employ a ratio test between the first-degree and second-degree nearest neighbors of a descriptor as determined by nearest neighbor module 110. Matching module 112 may determine that two keypoints are matching if the Euclidean distance of the first-degree nearest neighbor is below a certain threshold and if the ratio test between the first-degree and second-degree nearest neighbors is below a certain threshold. This may reduce false positive keypoint matches. In some embodiments, first-degree neighbors that aren't sufficiently close to a keypoint relative to the second-degree neighbor may be omitted from the set of matching keypoints by matching module 112. In some embodiments, matching module 112 may make a final determination on whether the image matches the source image. In some embodiments, this may include determining whether the image has a number of matching keypoints greater than a pre-defined threshold.

In some embodiments, dHash module 114 may be configured to compare image and determine if the images are matching using a dHash algorithm. In some embodiments, dHash module 114 may be configured to perform process 600 of FIG. 6. Details of the dHash algorithm are described in the discussion of FIG. 6. In some embodiments, database 116 may store images provided by entities that are being protected. For example, if an entity (e.g. a corporation) wishes to monitor social media networks to detect profiles that are impersonating an employee, such as the CEO, the entity may provide known images of the CEO. These images may be stored and maintained in database 116 for analysis and use by modules 108-114.

The various system components—such as modules 108-116—may be implemented using hardware and/or software configured to perform and execute the processes, steps, or other functionality described in conjunction therewith.

Figure 2:
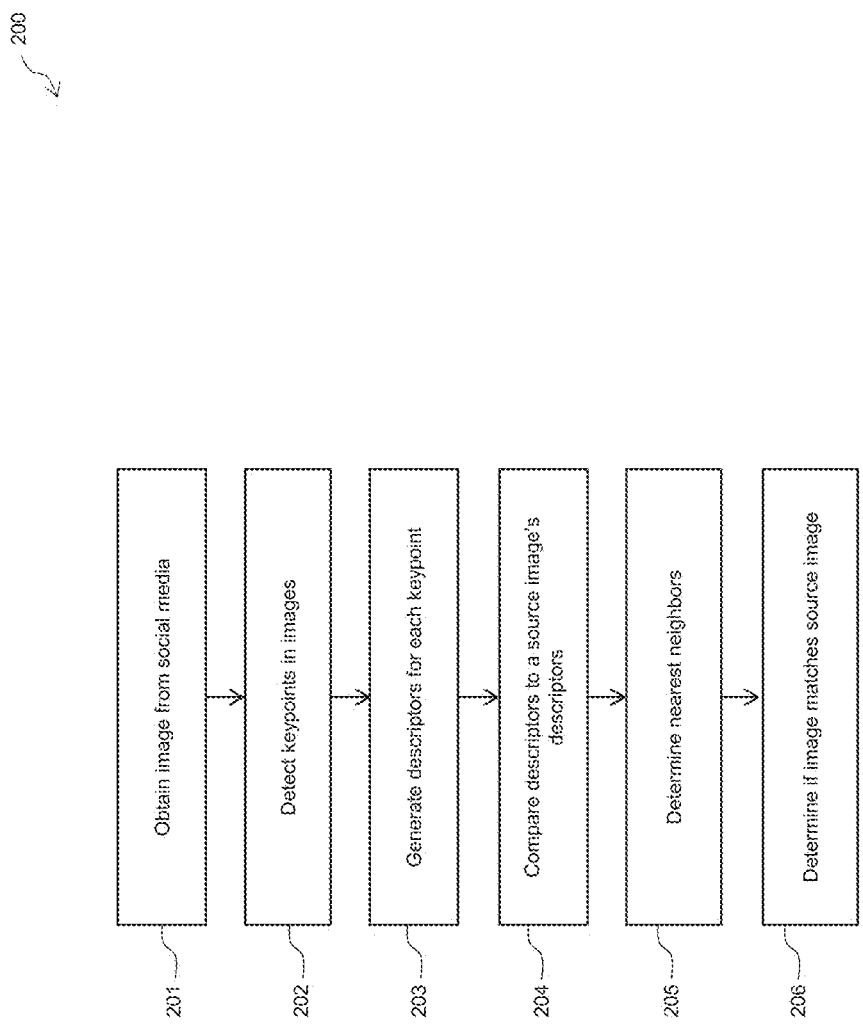
FIG. 2 is a flow diagram showing processing that may occur within the system of FIG. 1, according to some embodiments of the present disclosure.

FIG. 2 is a flow diagram showing process 200 that may occur within the system of FIG. 1, according to some embodiments of the present disclosure. In the context of system 100, process 200 may be performed by server device 106. In some embodiments, process 200 may be performed in response to detecting a candidate impersonating profile of a protected social entity based on information other than image data and may be used to detect if an image associated with the candidate impersonating profile matches a known image of the protected social entity stored in database 116. At block 201, server device 106 may obtain an image associated with a social media profile from a social media network. For example, server device 106 may detect (or be notified from a separate module or server) that a certain Twitter account has the same name, location, and date of birth as an entity's CEO, qualifying as an impersonating profile candidate. Server device 106 may then obtain the profile picture of that account.

Figure 3:
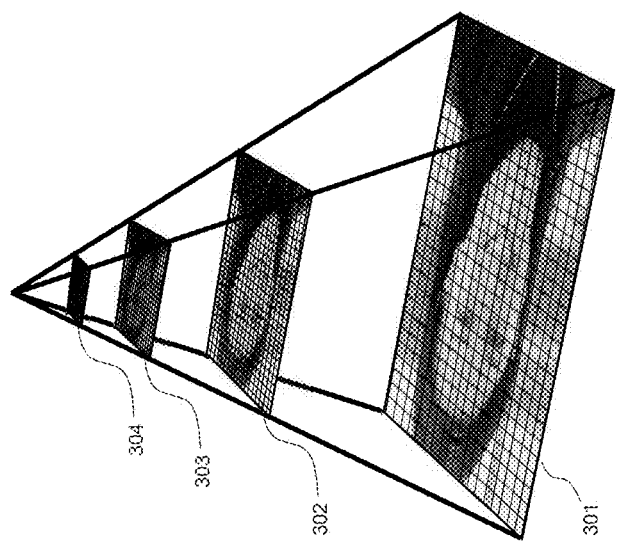
FIG. 3 is a visualization of a pyramid scaling methodology, according to some embodiments of the present disclosure.

At block 202, keypoint module 108 may detect keypoints in the obtained image. In some embodiments, keypoint module 108 may employ an oriented FAST algorithm (as described in relation to ORB) to detect keypoints. In some embodiments, keypoint module 108 may detect keypoints in both the obtained image and the "known" image (source image) stored in database 116. In some embodiments, detecting a keypoint may include, for a given pixel, analyzing the intensity of each surrounding pixel. Keypoint module 108 may classify a number of surrounding pixels (e.g. 16 surrounding pixels) as having an intensity lighter than, greater than, or the same as the given pixel. If a pixel has more than a pre-defined threshold number of pixels darker or brighter, it may be considered a keypoint by keypoint module 108. In some embodiments, the threshold may be eight. In some embodiments, keypoint module 108 may create an image pyramid of the obtained image and the source image. An example image pyramid is shown in FIG. 3. Keypoint module 108 may detect keypoints at each level of the two pyramids.

At block 203, keypoint module 108 may generate descriptors for each keypoint detected at block 202. In some embodiments, the descriptor may be generated with a BRIEF algorithm. In some embodiments, after detecting a keypoint, keypoint module 108 may compute an orientation of the keypoint based on the intensity centroid. An intensity centroid is similar to a center of mass, but is based on intensity. In some embodiments, the orientation of the keypoint may be an angle obtained by analyzing the vector from the center of the "corner" to the intensity centroid. In some embodiments, this may allow for a rotation to a canonical rotation, which may allow keypoints to be compared with rotation invariance. A descriptor may be a vector with a length of two hundred and fifty six. The descriptor for a given keypoint may be generated by conducting binary intensity tests. A binary intensity test may assign a bit value of 1 to pixels with an intensity greater than the keypoint and a bit value of 0 to pixels with an intensity lower than the keypoint, or vice versa. Keypoint module 108 may perform this analysis on a pre-defined number of pixels in a region surrounding a detected keypoint. In some embodiments, keypoint module 108 may alter the generated vector by the orientation of the keypoint, as described above. In some embodiments, keypoint module 108 may smooth the image prior to generating descriptors for each keypoint. In some embodiments, keypoint module 108 may generate descriptors for keypoints in both the obtained image and the source image.

At block 204, keypoint module 108 may compare descriptors for each keypoint. This may include comparing descriptors generated for keypoints of the image obtained in block 201 with descriptors generated for keypoints of the source image. In some embodiments, comparing two descriptors may include calculating the Euclidean distance between the two descriptors, as descriptors are vectors. In some embodiments, keypoint module 108 may, for each keypoint detected in the obtained image, calculate the Euclidean distance between the keypoint and every keypoint in the source image. At block 205, nearest neighbor module 110 may employ a nearest neighbor search algorithm, such as LSH (or other algorithms of FLANN), to determine the nearest neighbors for each keypoint in the obtained image. In some embodiments, determining the nearest neighbors for a keypoint may include determining a first-degree and second-degree neighbor. This may reflect the two keypoints of the source image that are closest to the keypoint in the obtained image. In some embodiments, blocks 204 and 205 may be performed simultaneously. For example, comparing the descriptors may be performed using a nearest neighbor search.

At block 206, matching module 112 may determine if the obtained image matches the source image. In some embodiments, this may include filtering the nearest neighbor results to remove false positive keypoint matches. Matching module 112 may employ a ratio test between the first-degree and second-degree nearest neighbors of a descriptor as determined by nearest neighbor module 110. Matching module 112 may determine that two keypoints are matching if the Euclidean distance of the first-degree nearest neighbor is below a certain threshold and if the ratio test between the first-degree and second-degree nearest neighbors is below a certain threshold. In some embodiments, the threshold ratio may be between 0.55 and 0.6 Matching module 112 may determine that the obtained image matches the source image if a threshold number of matching keypoints have been detected. In some embodiments, the threshold number of matching keypoints may be between 4 and 6.

FIG. 3 is a visualization of a pyramid scaling methodology, according to some embodiments of the present disclosure. During the performance of block 202, keypoint module 108 may also generate a multiscale image pyramid, such as the one shown in FIG. 3. The image pyramid contains a base image 301 (e.g. the image obtained in block 201 of process 200 or the source image of process 200) and multiple rescaled versions of the base image 301, such as images 302-304. The rescaled images may be down-sampled versions of the previous scale. For example, if the base image 301 is 2048×1536 pixels, image 302 may be 1024×768, image 303 may be 512×384, and image 304 may be 256×192. Keypoints may be detected at all levels and the algorithms described in relation to process 200 may be performed on all levels. In some embodiments, a pyramid, such as the one described in FIG. 3, may be generated via a process 400 of FIG. 4.

Figure 4:
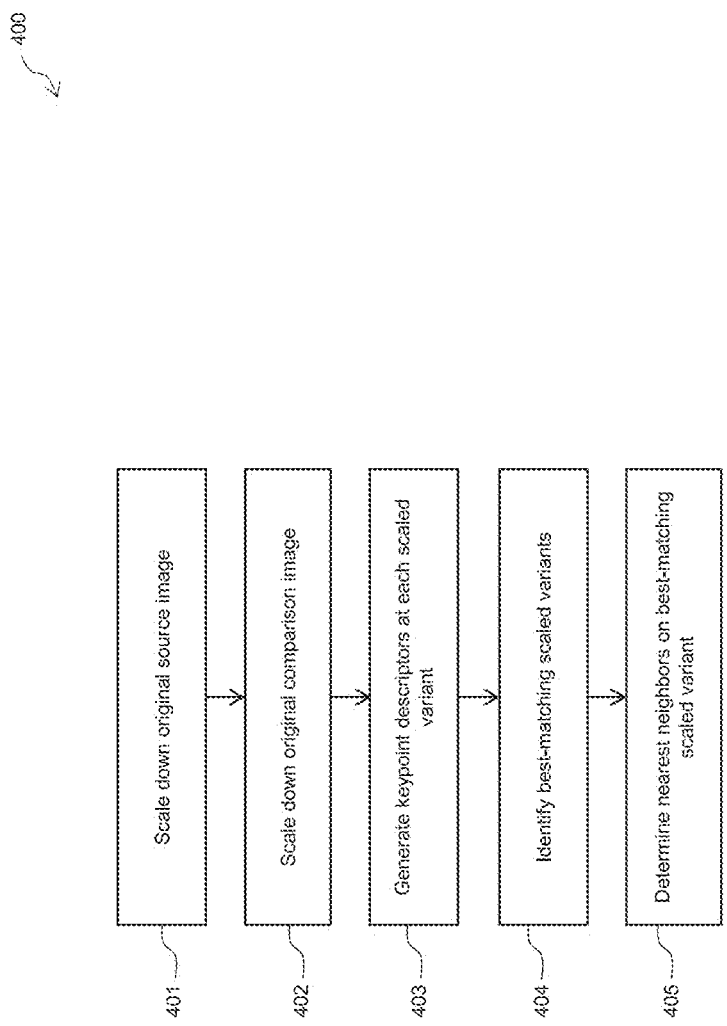
FIG. 4 is a flow diagram showing processing that may occur within the system of FIG. 1 to scale a pyramid, according to some embodiments of the present disclosure.

FIG. 4 is a flow diagram showing process 400 that may occur within the system of FIG. 1 to scale a pyramid, according to some embodiments of the present disclosure. Although ORB itself has internal scaling methodologies, a hybrid approach, such as process 400, with explicit pyramid scaling procedures applied to images may be superior, both in terms of computational efficiency and accuracy/performance. Process 400 may be performed in conjunction with process 200, e.g. after blocks 201 and 202. Assuming block 201 has been performed and an image (e.g. a comparison image) has been obtained from a social media network and keypoints have been detected on the images (block 202), the comparison image and a base image may be analyzed according to process 400. At block 401, keypoint module 108 may scale down the original source image. In some embodiments, the scaling down may be successive, meaning the image may be scaled down multiple times. For example, a 600×600 image may be scaled down to 128×128, 64×64, and 32×32. The scaled down versions of an image may herein be referred to as scaled variants. In some embodiments, keypoint module 108 may scale the image down to a pre-defined minimum scale. The minimum scale may be pre-defined by a user. At block 402, keypoint module 108 may also scale down the original comparison image. In some embodiments, the scaling down may be successive, meaning the comparison image may be scaled down multiple times, just as in block 401. Note, the original source image and comparison image do not need to be the same size; in other words, while a source image may be 1024×512, a comparison image may be other a different size such as 500×500 or 1000×512. Note, this also may apply to block 201 of FIG. 2.

At block 403, keypoint module 108 may generate keypoint descriptors at each scaled variant. In some embodiments, the computations may be performed on each scaled variant of both the source image and the comparison image. In some embodiments, keypoint descriptors may also be computed on the original image. Block 403 may yield a keypoint descriptor pyramid for every image processed. In some embodiments, the keypoint descriptors may only be generated down to a pre-defined minimum scale. For example, a setting may dictate that keypoint descriptors may not be generated on scaled variants smaller than 20×20 or 32×32. At block 404, keypoint module 108 may identify best-matching scaled variants between the source image pyramid and the comparison image pyramid. In some embodiments, "best-matching" may refer to "closeness." Best-matching scaled variants may be variants from each of the source image pyramid and comparison image pyramid where the absolute value of the difference of squares between the variants is the smallest. Identifying best-matching variants may include, for each variant of the source image pyramid, calculating the absolute value of the differences of squares between the variant of the source image pyramid and each variant of the comparison image pyramid. The pair with the smallest absolute value may constitute best-matching scaled variants.

At block 405, nearest neighbor module 110 may determine nearest neighbors on the best-matching scaled variants. This may be in contrast to performing a nearest neighbor search on the original image's keypoint descriptors. In some embodiments, block 405 may be the same as or similar to block 205 of FIG. 2. In some embodiments, nearest neighbor module 110 may employ a nearest neighbor search algorithm, such as LSH (or other algorithms of FLANN), to determine the nearest neighbors for each keypoint in the best-matching scaled variants identified at block 404. In some embodiments, determining the nearest neighbors for a keypoint may include determining a first-degree and second-degree neighbor. This may reflect the two keypoints of the source image that are closest to the keypoint in the obtained image. For example, an original source image may be 240×240, with descriptors generated for 120×120 and 60×60, while the original comparison image may be 600×600 with descriptors generated 256×256, 128×128. 64×64, and 32×32. The "best-matching" scaled invariants may be the 64×64 and 60×60 variants. In this example, nearest neighbor module 110 may determine nearest neighbors on the 64×64 variant of the comparison image and the 60×60 variant of the source image. In the context of process 400 being performed in conjunction with process 200, processing would then proceed to block 206 to determine if the comparison image matches the source image. In some embodiments, the keypoint descriptors may be generated after the best-matching scale is determined (e.g. block 403 is performed after block 404). This may optimize the CPU and provide a better computational efficiency.

Figure 5:
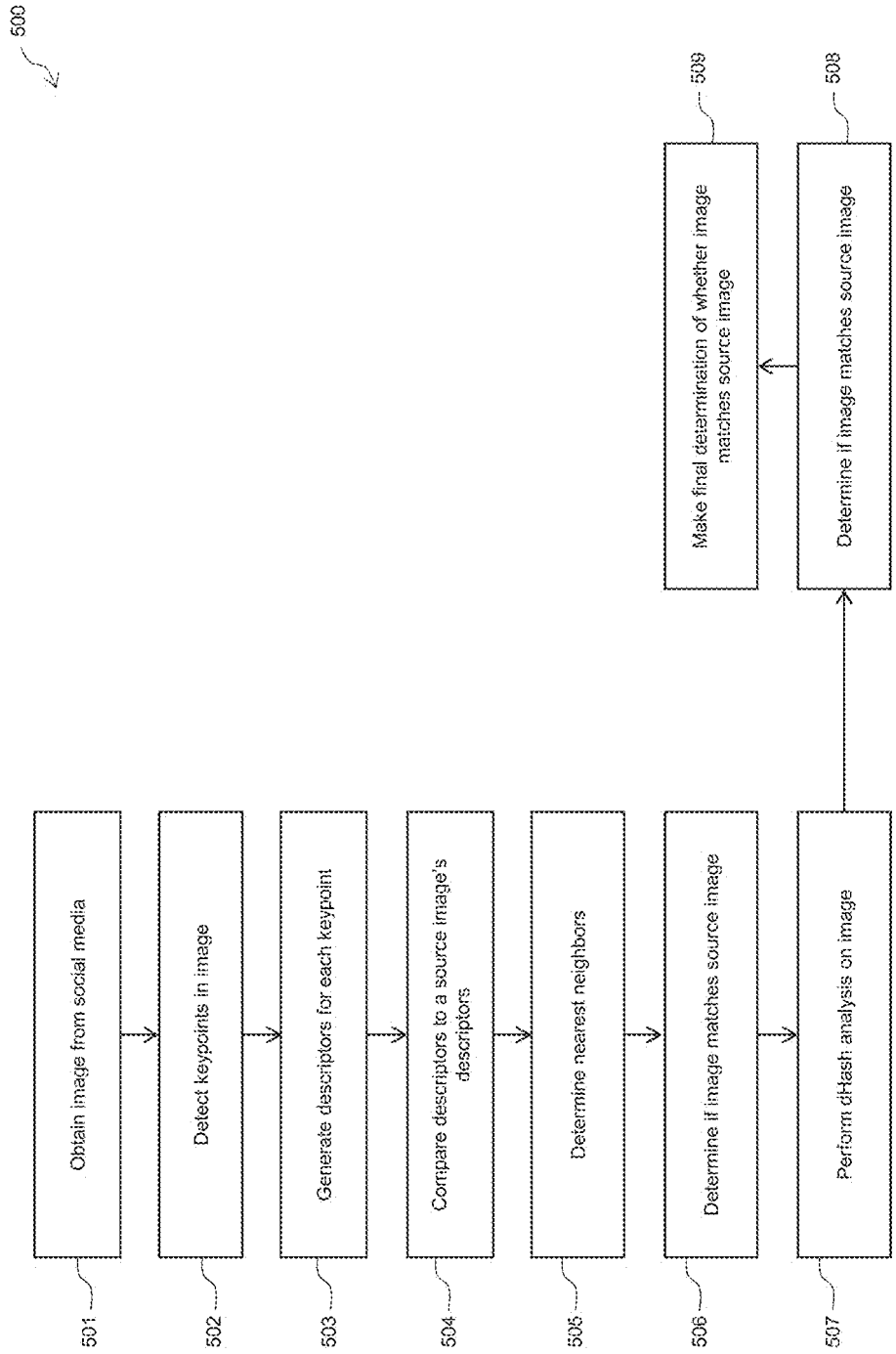
FIG. 5 is another flow diagram showing processing that may occur within the system of FIG. 1, according to some embodiments of the present disclosure.

FIG. 5 is another flow diagram showing process 500 that may occur within the system of FIG. 1, according to some embodiments of the present disclosure. Blocks 501-506 may be performed the same as blocks 201-206 of process 200. At block 507, dHash module 114 may perform a dHash analysis on the obtained image, where a dHash algorithm is used to determine if the obtained image matches the source image. Details describing the dHash algorithm are described below in relation to FIG. 6. At block 508, dHash module 114 may determine if, as a result of the dHash algorithm, the obtained image matches the source image. At block 509, matching module 112 may make a final determination of whether the obtained image matches the source image. In some embodiments, the final determination may be based on the determination of both the dHash analysis and the keypoint detection analysis. In some embodiments, if both algorithms detect a match, then the images may be determined to be matching. In some embodiments, if at least one of the algorithms detect a match, then the images may be determined to be matching.

Figure 6:
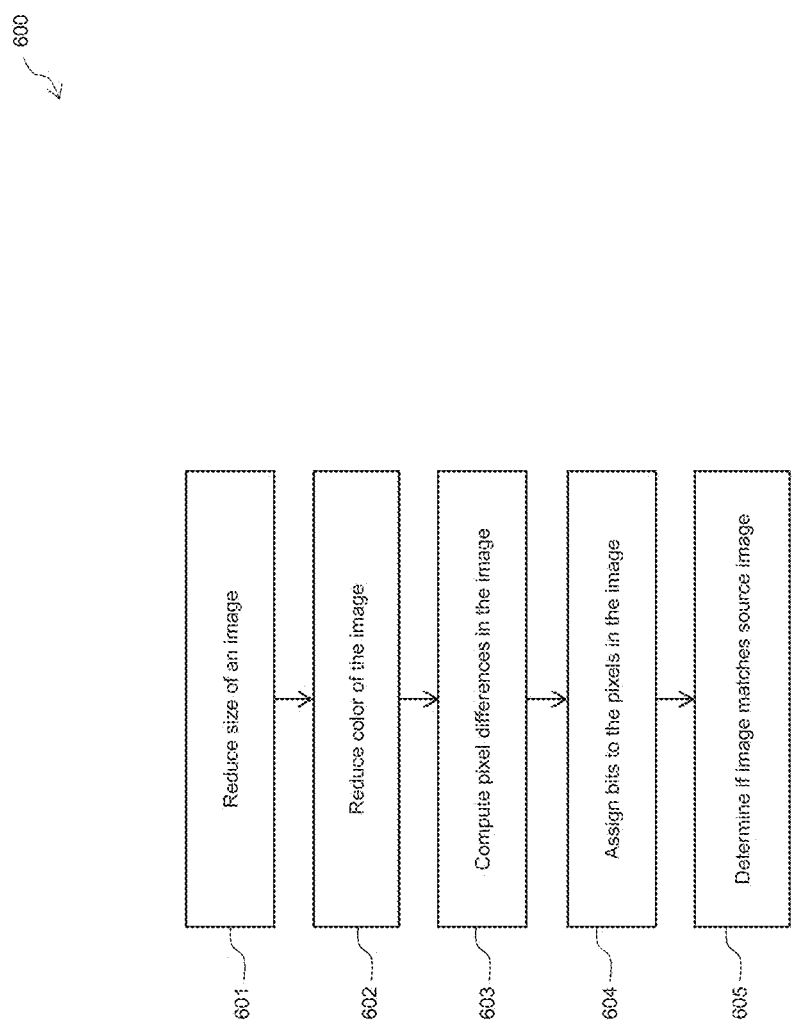
FIG. 6 is another flow diagram showing processing that may occur within the system of FIG. 1, according to some embodiments of the present disclosure.

FIG. 6 is another flow diagram showing process 600 that may occur within the system of FIG. 1, according to some embodiments of the present disclosure. dHash module 114 may perform process 600 in order to perform a dHash analysis of an image (e.g. the image obtained at block 201 or 501). At block 601, dHash module 114 may reduce the size of the image. In some embodiments, reducing the size of the image may include down-sampling the image to a pre-defined aspect ratio (e.g. from 2048×1536 to 64×48). At block 602, dHash module 114 may reduce the color of the image. In some embodiments, reducing the color of the image may include reducing the image to a grayscale color scheme. In some embodiments, block 602 may be performed before block 601.

At block 603, dHash module 114 may compute pixel differences in the image. In some embodiments, computing pixel differences may include, for each pixel of the image, computing the difference in intensity between adjacent pixels. At block 604, dHash module may assign bits to each pixel of the image based on the difference hash generated at block 603. Each bit assigned to a pixel is based on the comparative brightness of the adjacent pixel to the left. For example, given two pixels, if the left pixel is brighter than the right pixel, the left pixel is assigned a 1 and the right pixel is assigned a 0. This may be referred to as a "difference hash", which is a bitmap that encodes brightness gradients across the image. At block 605, dHash module 114 may determine if the image matches a source image. In some embodiments, this may include comparing the difference hash of the image with the difference hash of the source image. Comparing two difference hashes may include computing a Hamming distance, where the Hamming distance if the number of bits that are different across the two hashes. Low values, close to zero, may indicate that the images are matches, while values greater than a certain pre-defined threshold (i.e. ten) may indicate that the images may be different.

Figure 7:
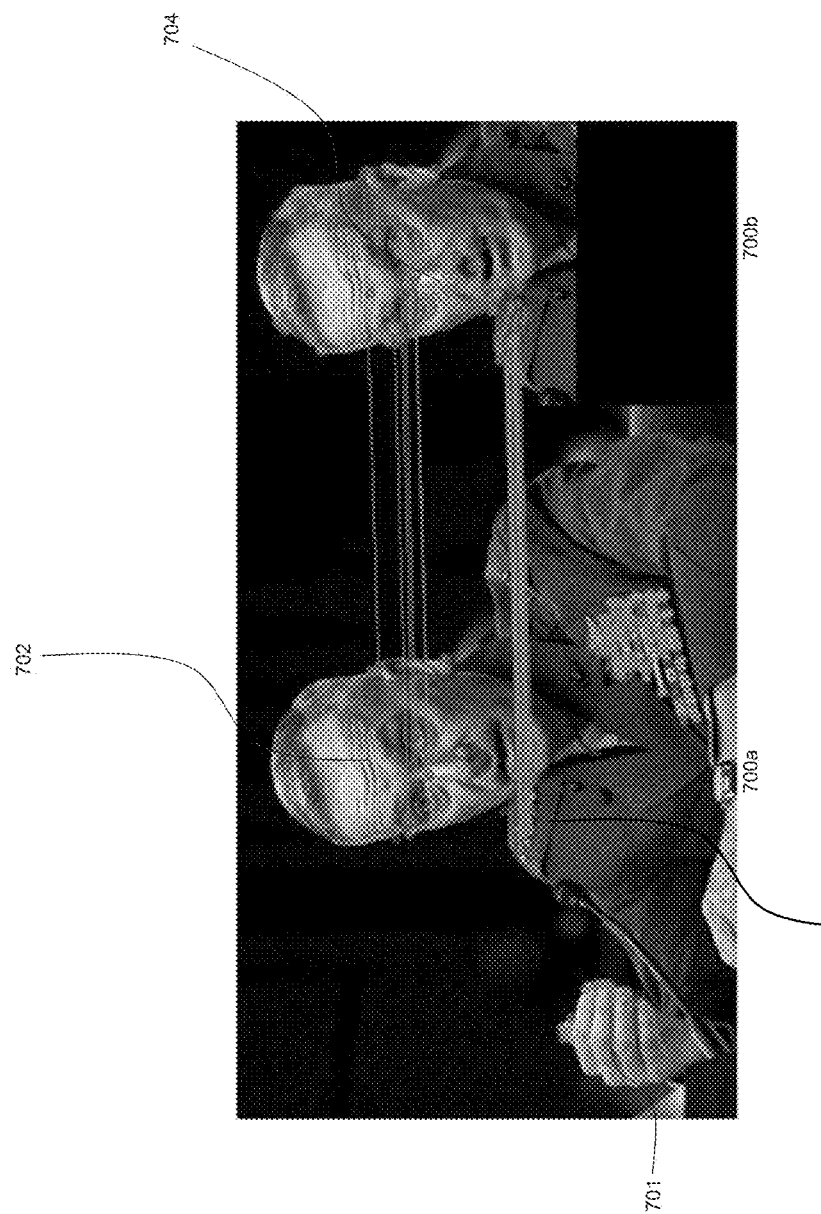
FIG. 7 is a visualization of keypoint matching between images, according to some embodiments of the present disclosure.

FIG. 7 is a visualization of keypoint matching between images, according to some embodiments of the present disclosure. In the context of the present disclosure, picture 700*a* may be a source image and picture 700*b* may be an image obtained from a social media profile. It is the same picture as 700*a* but with significant cropping. The plurality of circles on the two images indicate keypoints detected according to some embodiments of the present disclosure. The lines correspond to keypoints that are determined to be matching. The numerous lines beginning from the circles 703 indicate a plurality of matching keypoints detected in each photo related to the person's clothing. There are a plurality of keypoints 704 on image 700*b* and keypoints 701 on image 700*a* that were not found to match. There are additional matching keypoints 702, as indicated by the connecting lines.

Figure 8:
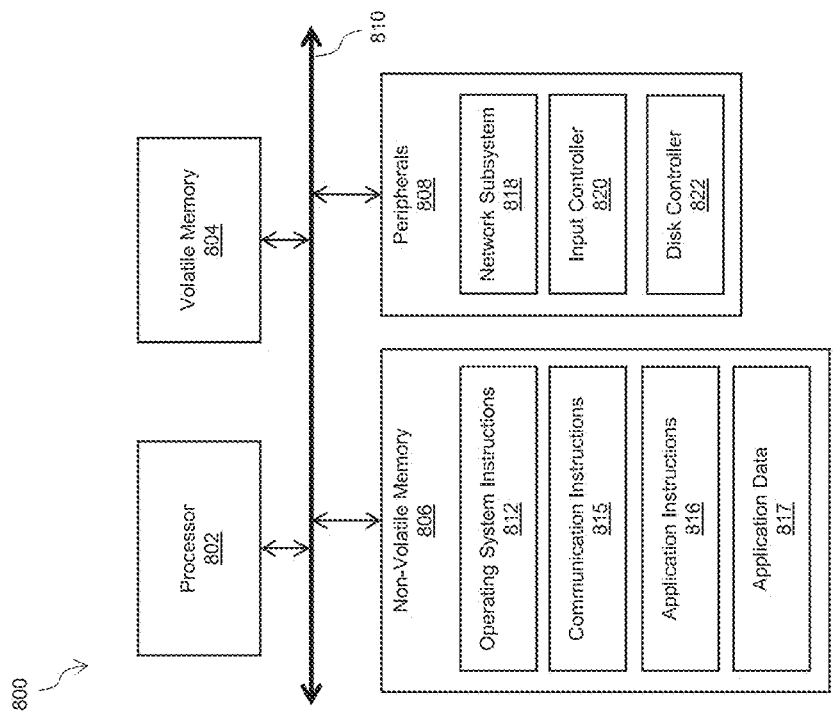
FIG. 8 is a diagram of an illustrative server device that can be used within systems of FIG. 1, according to some embodiments of the present disclosure.

FIG. 8 is a diagram of an illustrative server device 800 that can be used within systems of FIGS. 1-3, according to some embodiments of the present disclosure. In some embodiments, server device 800 may be a virtual server device, such as an Elastic Compute Cloud (EC2) instance of spot instance within Amazon Web Services. Server device 800 may implement various features and processes as described herein. Server device 800 may be implemented on any electronic device that runs software applications derived from complied instructions, including without limitation personal computers, servers, smart phones, media players, electronic tablets, game consoles, email devices, etc. In some implementations, server device 800 may include one or more processors 802, volatile memory 804, non-volatile memory 806, and one or more peripherals 808. These components may be interconnected by one or more computer buses 810.

Processor(s) 802 may use any known processor technology, including but not limited to graphics processors and multi-core processors. Suitable processors for the execution of a program of instructions may include, by way of example, both general and special purpose microprocessors, and the sole processor or one of multiple processors or cores, of any kind of computer. Bus 810 may be any known internal or external bus technology, including but not limited to ISA, EISA, PCI, PCI Express, NuBus, USB, Serial ATA, or FireWire. Volatile memory 804 may include, for example, SDRAM. Processor 802 may receive instructions and data from a read-only memory or a random access memory or both. The essential elements of a computer may include a processor for executing instructions and one or more memories for storing instructions and data.

Non-volatile memory 806 may include by way of example semiconductor memory devices, such as EPROM, EEPROM, and flash memory devices; magnetic disks such as internal hard disks and removable disks; magneto-optical disks; and CD-ROM and DVD-ROM disks. Non-volatile memory 806 may store various computer instructions including operating system instructions 812, communication instructions 814, application instructions 816, and application data 817. Operating system instructions 812 may include instructions for implementing an operating system (e.g., Mac OS®, Windows®, or Linux). The operating system may be multi-user, multiprocessing, multitasking, multithreading, real-time, and the like. Communication instructions 814 may include network communications instructions, for example, software for implementing communication protocols, such as TCP/IP, HTTP, Ethernet, telephony, etc. Application instructions 816 can include instructions for detecting deepfake videos using a plurality of weak classifiers according to the systems and methods disclosed herein. For example, application instructions 816 may include instructions for components 108-116 described above in conjunction with FIG. 1.

Peripherals 808 may be included within server device 800 or operatively coupled to communicate with server device 800. Peripherals 808 may include, for example, network subsystem 818, input controller 820, and disk controller 822. Network subsystem 818 may include, for example, an Ethernet of WiFi adapter. Input controller 820 may be any known input device technology, including but not limited to a keyboard (including a virtual keyboard), mouse, track ball, and touch-sensitive pad or display. Disk controller 822 may include one or more mass storage devices for storing data files; such devices include magnetic disks, such as internal hard disks and removable disks; magneto-optical disks; and optical disks. Methods described herein may represent processing that occurs within a system for detecting impersonating social media profiles (e.g., system 100 of FIG. 1). The subject matter described herein can be implemented in digital electronic circuitry, or in computer software, firmware, or hardware, including the structural means disclosed in this specification and structural equivalents thereof, or in combinations of them. The subject matter described herein can be implemented as one or more computer program products, such as one or more computer programs tangibly embodied in an information carrier (e.g., in a machine readable storage device), or embodied in a propagated signal, for execution by, or to control the operation of, data processing apparatus (e.g., a programmable processor, a computer, or multiple computers). A computer program (also known as a program, software, software application, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, sub programs, or portions of code). A computer program can be deployed to be executed on one computer or on multiple computers at one site or distributed across multiple sites and interconnected by a communication network.

The processes and logic flows described in this specification, including the method steps of the subject matter described herein, can be performed by one or more programmable processors executing one or more computer programs to perform functions of the subject matter described herein by operating on input data and generating output. The processes and logic flows can also be performed by, and apparatus of the subject matter described herein can be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processor of any kind of digital computer. Generally, a processor will receive instructions and data from a read only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. Information carriers suitable for embodying computer program instructions and data include all forms of nonvolatile memory, including by way of example semiconductor memory devices, such as EPROM, EEPROM, flash memory device, or magnetic disks. The processor and the memory can be supplemented by, or incorporated in, special purpose logic circuitry.

It is to be understood that the disclosed subject matter is not limited in its application to the details of construction and to the arrangements of the components set forth in the following description or illustrated in the drawings. The disclosed subject matter is capable of other embodiments and of being practiced and carried out in various ways. Also, it is to be understood that the phraseology and terminology employed herein are for the purpose of description and should not be regarded as limiting. As such, those skilled in the art will appreciate that the conception, upon which this disclosure is based, may readily be utilized as a basis for the designing of other structures, methods, and systems for carrying out the several purposes of the disclosed subject matter. It is important, therefore, that the claims be regarded as including such equivalent constructions insofar as they do not depart from the spirit and scope of the disclosed subject matter.

Although the disclosed subject matter has been described and illustrated in the foregoing illustrative embodiments, it is understood that the present disclosure has been made only by way of example, and that numerous changes in the details of implementation of the disclosed subject matter may be made without departing from the spirit and scope of the disclosed subject matter.

The invention claimed is:

1. A method for determining whether two images match performed by a server, the method comprising:
generating a first scaled variant pyramid associated with a first image and a second scaled variant pyramid associated with a second image, each scaled variant pyramid comprising a plurality of scaled variants of the associated image;
determining a pair of best-matching variants, the pair of best-matching variants comprising a first variant from the first scaled variant pyramid and a second variant from the second scaled variant pyramid that best-matches the first variant;
detecting a first plurality of keypoints in the first variant and a second plurality of keypoints in the second variant;
generating a descriptor for each keypoint of the first plurality of keypoints to create a first plurality of keypoint descriptors, each descriptor of the first plurality of keypoint descriptors being associated with a keypoint of the first plurality of keypoints;
generating a descriptor for each keypoint of the second plurality of keypoints to create a second plurality of keypoint descriptors, each descriptor of the second plurality of keypoint descriptors being associated with a keypoint of the second plurality of keypoints;
for each keypoint of the first plurality of keypoints, identifying a keypoint match from the second plurality of keypoints;
determining that a number of keypoint matches is above a threshold number; and
in response to determining that the number of keypoint matches is above the threshold number, determining that the first image matches the second image.

2. The method of claim 1, wherein identifying the keypoint match comprises:
determining, via a locality-sensitivity hash (LSH) algorithm and based on the first and second pluralities of keypoint descriptors, a first and second degree nearest neighbor, each nearest neighbor comprising a keypoint of the second plurality of keypoints;

performing a ratio test on the first and second degree nearest neighbors to calculate a ratio;

determining that the ratio is above a threshold value; and in response to determining that the ratio is above the threshold value, determining that the keypoint of the first plurality of keypoints and the keypoint of the first degree nearest neighbor constitute the keypoint match.

3. The method of claim 2, wherein the threshold ratio is between 0.55 and 0.6.

4. The method of claim 1, wherein determining the pair of best-matching variants comprises, for each scaled variant of the first scaled variant pyramid:

calculating an absolute value of a difference of squares between the scaled variant of the first scaled variant pyramid and each scaled variant of the second scaled variant pyramid; and identifying the scaled variant of the first scale variant pyramid and the scaled variant of the second scale variant pyramid with a lowest absolute value as the pair of best-matching variants.

5. The method of claim 1, wherein detecting the first and second pluralities of keypoints comprises, for each pixel in the first and second variant:

assigning an intensity value to the pixel and a plurality of surrounding pixels;

determining whether the intensity value of each pixel of the plurality of surrounding pixels is greater than, less than, or the same as the intensity of the pixel; and in response to determining that a pre-defined threshold number of pixels of the plurality of surrounding pixels have intensities one of greater than or less than the intensity value of the pixel, determining that the pixel is a keypoint.

6. The method of claim 1, wherein detecting the first and second pluralities of keypoints and generating a descriptor comprises using an oriented features from accelerated segment test and rotated binary robust independent elementary features (ORB) algorithm.

7. The method of claim 1, wherein the threshold number of matching keypoints is four, five, or six.

8. The method of claim 1, wherein generating the descriptor for each keypoint of the first plurality of keypoints and generating the descriptor for each keypoint of the second plurality of keypoints comprises, for each keypoint:

assigning a bit value of 1 to a plurality of pixels surrounding the keypoint with an intensity greater than the keypoint;

assigning a bit value of 0 to a plurality of pixels surrounding the keypoint with an intensity less than or equal to the keypoint;

creating an intensity centroid for the plurality of pixels;

detecting a corner based on the intensity of each of the plurality of pixels; and generating a vector based on the intensity centroid and the corner, the vector being the descriptor.

9. The method of claim 8, wherein the descriptor is a vector with a length of two hundred and fifty six.

10. The method of claim 9, wherein determining a nearest neighbor comprises calculating a Euclidean distance between a descriptor of the first plurality of keypoint descriptors and at least one descriptor of the second plurality of descriptors.

11. A method for determining whether a first image matches a second image performed by a server, the method comprising:

generating a scaled variant pyramid for each of the first image and the second image to obtain a first scaled variant pyramid associated with the first image and a second scaled variant pyramid associated with the second image, each scaled variant pyramid comprising a plurality of scaled variants of an associated image;

determining a pair of best-matching variants, the pair of best-matching variants comprising a first variant from the first scaled variant pyramid and a second variant from the second scaled variant pyramid that best-matches the first variant;

detecting a first plurality of keypoints in the first variant and a second plurality of keypoints in the second variant;

generating a descriptor for each keypoint of the first plurality of keypoints to create a first plurality of keypoint descriptors, each descriptor of the first plurality of keypoint descriptors being associated with a keypoint of the first plurality of keypoints;

generating a descriptor for each keypoint of the second plurality of keypoints to create a second plurality of keypoint descriptors, each descriptor of the second plurality of keypoint descriptors being associated with a keypoint of the second plurality of keypoints;

for each keypoint of the first plurality of keypoints, identifying a keypoint match from the second plurality of keypoints;

determining that a number of keypoint matches is above a threshold number;

analyzing the first and second image to generate a match prediction via a difference hash (dHash) algorithm; and in response to determining that the number of keypoint matches is above the threshold number and generating a match prediction that indicates a match, determining that the first image matches the second image.

12. The method of claim 11, wherein analyzing the first and second image to generate a match prediction via the dHash algorithm comprises:

for each of the first and second image:

down-sampling the image to reduce a size of the image;

reducing colors of the image to a grayscale color scheme;

for each pixel, computing a difference in intensity between adjacent pixels; and assigning a bit value to each pixel based on the difference to create a difference hash; and comparing the difference hash of each image to generate a match prediction.

13. The method of claim 11, wherein identifying the keypoint match comprises:

determining, via a locality-sensitivity hash (LSH) algorithm and based on the first and second pluralities of keypoint descriptors, a first and second degree nearest neighbor, each nearest neighbor comprising a keypoint of the second plurality of keypoints;

performing a ratio test on the first and second degree nearest neighbors to calculate a ratio;

determining that the ratio is above a threshold value; and in response to determining that the ratio is above the threshold value, determining that the keypoint of the first plurality of keypoints and the keypoint of the first degree nearest neighbor constitute the keypoint match.

14. The method of claim 13, wherein the threshold ratio is between 0.55 and 0.6.

15. The method of claim 11, wherein determining the pair of best-matching variants comprises, for each scaled variant of the first scaled variant pyramid:
- calculating an absolute value of a difference of squares between the scaled variant of the first scaled variant pyramid and each scaled variant of the second scaled variant pyramid; and
- identifying the scaled variant of the first scale variant pyramid and the scaled variant of the second scale variant pyramid with a lowest absolute value as the pair of best-matching variants.

16. The method of claim 11, wherein detecting the first and second pluralities of keypoints comprises:
- for each pixel in the first and second variant:
  - assigning an intensity value to the pixel and a plurality of surrounding pixels;
  - determining whether the intensity value of each pixel of the plurality of surrounding pixels is greater than, less than, or the same as the intensity of the pixel;
  - in response to determining that a pre-defined threshold number of pixels of the plurality of surrounding pixels have intensities one of greater than or less than the intensity value of the pixel, determining that the pixel is a keypoint.

17. The method of claim 11, wherein generating the descriptor for each keypoint of the first plurality of keypoints and generating the descriptor for each keypoint of the second plurality of keypoints comprises, for each keypoint:
- assigning a bit value of 1 to a plurality of pixels surrounding the keypoint with an intensity greater than the keypoint;
- assigning a bit value of 0 to a plurality of pixels surrounding the keypoint with an intensity less than or equal to the keypoint;
- creating an intensity centroid for the plurality of pixels;
- detecting a corner based on the intensity of each of the plurality of pixels; and
- generating a vector based on the intensity centroid and the corner, the vector being the descriptor.

18. The method of claim 11, wherein detecting the first and second pluralities of keypoints and generating a descriptor comprises using an oriented features from accelerated segment test and rotated binary robust independent elementary features (ORB) algorithm.

19. The method of claim 18, wherein determining a nearest neighbor comprises calculating a Euclidean distance between a descriptor of the first plurality of keypoint descriptors and at least one descriptor of the second plurality of descriptors.

20. A method for detecting impersonating social media profiles comprising:
- receiving a source image from a protected entity;
- detecting a candidate impersonating profile of the protected entity based on information other than image data;
- obtaining a comparison image from the candidate impersonating profile;
- generating a scaled variant pyramid for each of the comparison image and the source image to obtain a first scaled variant pyramid associated with the comparison image and a second scaled variant pyramid associated with the source image, each scaled variant pyramid comprising a plurality of scaled variants of an associated image;
- determining a pair of best-matching variants, the pair of best-matching variants comprising a first variant from the first scaled variant pyramid and a second variant from the second scaled variant pyramid that best-matches the first variant;
- detecting a first plurality of keypoints in the first variant and a second plurality of keypoints in the second variant;
- generating a descriptor for each keypoint of the first plurality of keypoints to create a first plurality of keypoint descriptors, each descriptor of the first plurality of keypoint descriptors being associated with a keypoint of the first plurality of keypoints;
- generating a descriptor for each keypoint of the second plurality of keypoints to create a second plurality of keypoint descriptors, each descriptor of the second plurality of keypoint descriptors being associated with a keypoint of the second plurality of keypoints;
- for each keypoint of the first plurality of keypoints, identifying a keypoint match, the identifying comprising:
  - determining, via a locality-sensitivity hash (LSH) algorithm, at least one nearest neighbor, each nearest neighbor comprising a keypoint from the second plurality of keypoints; and
  - analyzing the keypoint and the at least one nearest neighbor to identify the keypoint match;
- determining that a number of keypoint matches is above a threshold number; and
- in response to determining that the number of keypoint matches is above the threshold number, determining that the comparison image matches the source image.

* * * * *